United States Patent [19]

Brummett et al.

[11] 4,012,271
[45] Mar. 15, 1977

[54] WATER-COOLED SUPPORT BAR
[75] Inventors: Marshall G. Brummett, Toledo;
Russell W. Heckman, Perrysburg;
George A. Nickey; James E. Taylor,
both of Toledo, all of Ohio
[73] Assignee: Owens-Illinois, Inc., Toledo, Ohio
[22] Filed: Feb. 17, 1976
[21] Appl. No.: 658,631
[52] U.S. Cl. .................................. 156/423; 34/105;
156/498; 156/499; 156/567; 432/173
[51] Int. Cl.² .......................................... B65C 9/00
[58] Field of Search .......... 156/423, 446, 498, 499,
156/566, 567, 568; 198/20 R, 22 B, 32, 28;
65/60, 260; 427/226, 248; 118/503;
294/87.26; 425/446; 34/105, 106; 432/162,
124, 173

[56] References Cited
UNITED STATES PATENTS

| | | | |
|---|---|---|---|
| 2,740,541 | 4/1956 | Ashford | 294/87.26 |
| 3,808,702 | 5/1974 | Laessig | 34/105 |
| 3,871,943 | 3/1975 | Zodrow | 156/568 |
| 3,883,388 | 5/1975 | Amberg et al. | 156/446 |
| 3,934,993 | 1/1976 | Bowman et al. | 65/60 |
| 3,959,065 | 5/1976 | Ashcroft | 156/423 |

Primary Examiner—Charles E. Van Horn
Assistant Examiner—Jerome W. Massie
Attorney, Agent, or Firm—J. R. Nelson

[57] ABSTRACT

There is disclosed a water cooled support bar comprised of a pipe within a pipe which assures the axial position of a cylinder-like sleeve of heat shrinkable foam thermoplastic material on a glass container during transport from an assembly station on a turret machine into a tunnel-type oven and until the thermoplastic sleeve shrinks sufficiently snugly onto the container to be held thereby. Polyethylene material, and perhaps other polyolefins, have the tendency to become more pliable and grow or enlarge under heat prior to actually shrinking. It is during this initial heat-up time the invention serves to retain the sleeve form in place on the container. The support pipe includes a Teflon or like lubricious surface layer at least along the side thereof adjacent the plastic sleeve lower edge. The lubricious surface layer combined with water cooling prevents sticking of the plastic on the support bar.

14 Claims, 3 Drawing Figures

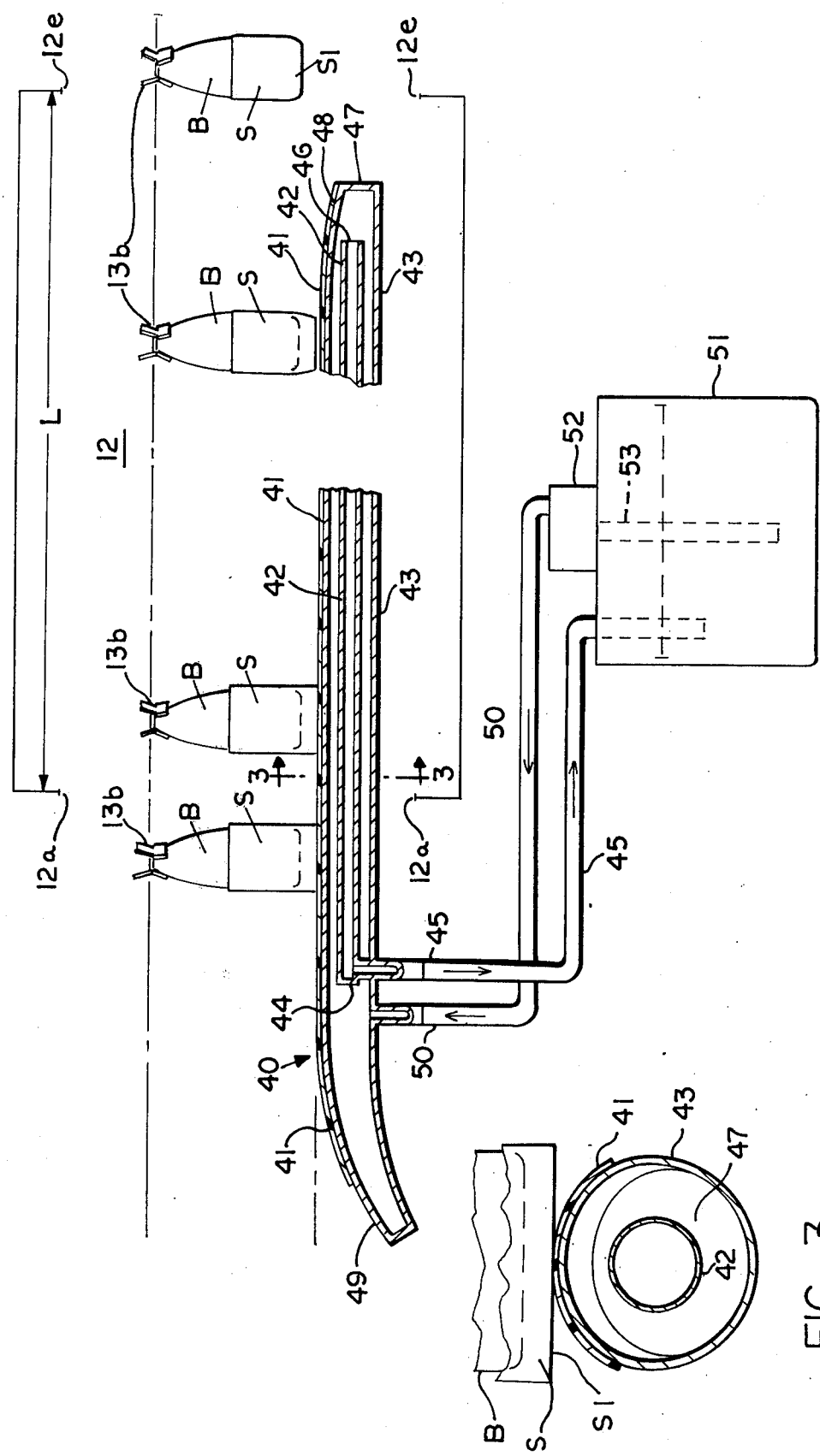

WATER-COOLED SUPPORT BAR

The present invention relates to the manufacture of plastic coated containers in which a glass container is provided with a shrunken plastic sleeve applied over its exterior surface. More particularly, the invention relates to apparatus for handling the glass container and telescopically applied sleeve of shrinkable plastic during processing in a heat shrink apparatus or oven.

PRIOR ART AND BACKGROUND OF THE INVENTION

In the manufacture of plastic covered glass containers of the type disclosed in U.S. Pat. No. 3,760,968, glass containers at elevated temperature are conveyed in vertical upright position by a ware handling conveyor in single file past a sleeve making apparatus. The sleeve making apparatus receives a continuous web of pre-printed plastic, preferably a foamed polystyrene or foamed polyethylene, and from the web supply cuts successive lengths of the material and feeds the lengths to individual cylindrical mandrels. The mandrels are disposed on a movable turrent of the machine with their central axes disposed vertically. Each length of the plastic is wrapped around the periphery of the mandrel so that the leading and trailing ends overlap whereat they are united, or firmly attached to each other to form a cylindrical sleeve. The mandrels of the sleeve making apparatus move in registry with the containers on the ware handling conveyor in an assembly station over a span of travel whereat the sleeves are stripped axially from the mandrel by a stripper mechanism and telescopically assembled onto the glass container. Thereafter, the stripper mechanism retracts from the sleeve leaving the latter to be carried with the glass container to a heat shrinking apparatus, usually in the form of a tunnel-like oven chamber.

Various means have been devised for assuring that the sleeve will remain in the telescopically assembled position on the container until shrunken snugly thereon in the heat shrinking apparatus, the sleeve making machine and heat shrinking oven being spaced apart a distance over which the container and sleeve thereon must travel until shrinking of the sleeve begins. One such means is disclosed in the copending application of R. A. Ashcroft, U.S. Ser. No. 464,224 filed Apr. 25, 1974, of common ownership with the present application, and which is now U.S. Pat. No. 3,959,065. The Ashcroft device includes a heat tacking means which zonally shrinks an annular band portion of the plastic sleeve just as the sleeve and container are assembled such that the shrunken band portion holds the sleeve in place until the container reaches the shrinking oven. In the manufacture of glass containers covered with a heat shrunken thermoplastic sleeve, specific forms being a foamed polyethylene, foamed-film laminate of polyethylene, or foamed polystyrene and a film of ethylene ethyl acrylate laminated on the exterior of the foam, some difficulty is experienced in zonally shrinking a portion of the sleeve in the time and distance available to maintain the assembly of the sleeve on the container. It should be pointed out that shrinkable polyethylene material, and perhaps some other polyolefins, have a tendency under application of heat to first become very limp and actually grow or expand as a sleeve form before shrinkage occurs. With this in mind, the polyethylene sleeve will often enlarge upon initial heating such that it will fall from position on the container.

SUMMARY OF THE INVENTION

By the present invention there is provided a sleeve support bar that extends along the path of the container conveyor from adjacent the mandrel and well into the heat shrinking oven. The support bar maintains the plastic sleeve in position on the container until the heat supplied by the shrinking oven contracts or shrinks the foam plastic sleeve tight enough on the bottle so that it will not slip or fall off. The support bar is mounted yieldably on a single mounting fixture at an elevation just below the bottom of the containers on the conveyor and generally centered under the containers along the path of travel to and in the oven. The support bar is liquid cooled, and kept at a temperature below 200° F, and preferably below 150° F, so as to prevent sticking of the polyethylene sleeve in sliding engagement with the support bar. The surface of the support bar adjacent the plastic sleeve is preferably coated with a low friction material, such as a layer of "Teflon".

The preferred construction of the liquid cooled support bar includes a concentric arrangement of a pipe within a pipe. The outer pipe is provided with coolant inlet and outlet connections to a coolant supply and a pump means for circulating coolant from the supply to the support pipe inlet and return to the supply from the outlet connection. The inside pipe receives coolant circulated the length of the outer pipe and the latter discharges the spent coolant into the inner pipe that is connected with the outlet. This is a compact design of preferable construction; however, a closed loop pipe construction may also be used. The support bar extends into the shrinking oven a substantial distance, and, therefore, would become extremely hot if it is not provided with cooling. The cooled support bar will support polyethylene sleeves in place well into the oven, as needed, because of the relatively slow shrink rate of such a polyolefin material.

Another important feature of the invention is the cantilevered mounting of the support bar at or near the entrance of the oven. The support bar thus extends into the oven providing for alignment adjustment of the bar in the container path and in the oven and without any support or mounting member therefor internally of the oven.

Other advantages and features of the invention will be more readily apparent to those skilled in the art from the following detailed description of the drawings, on which:

DESCRIPTION OF THE DRAWINGS

FIG. 2 is an elevational view, partly in section, of the water cooled support bar apparatus, shown in its operating position in a tunnel oven, and FIG. 3 is a sectional end elevational view taken along line 3—3 on FIG. 2.

DESCRIPTION

Figure 1:
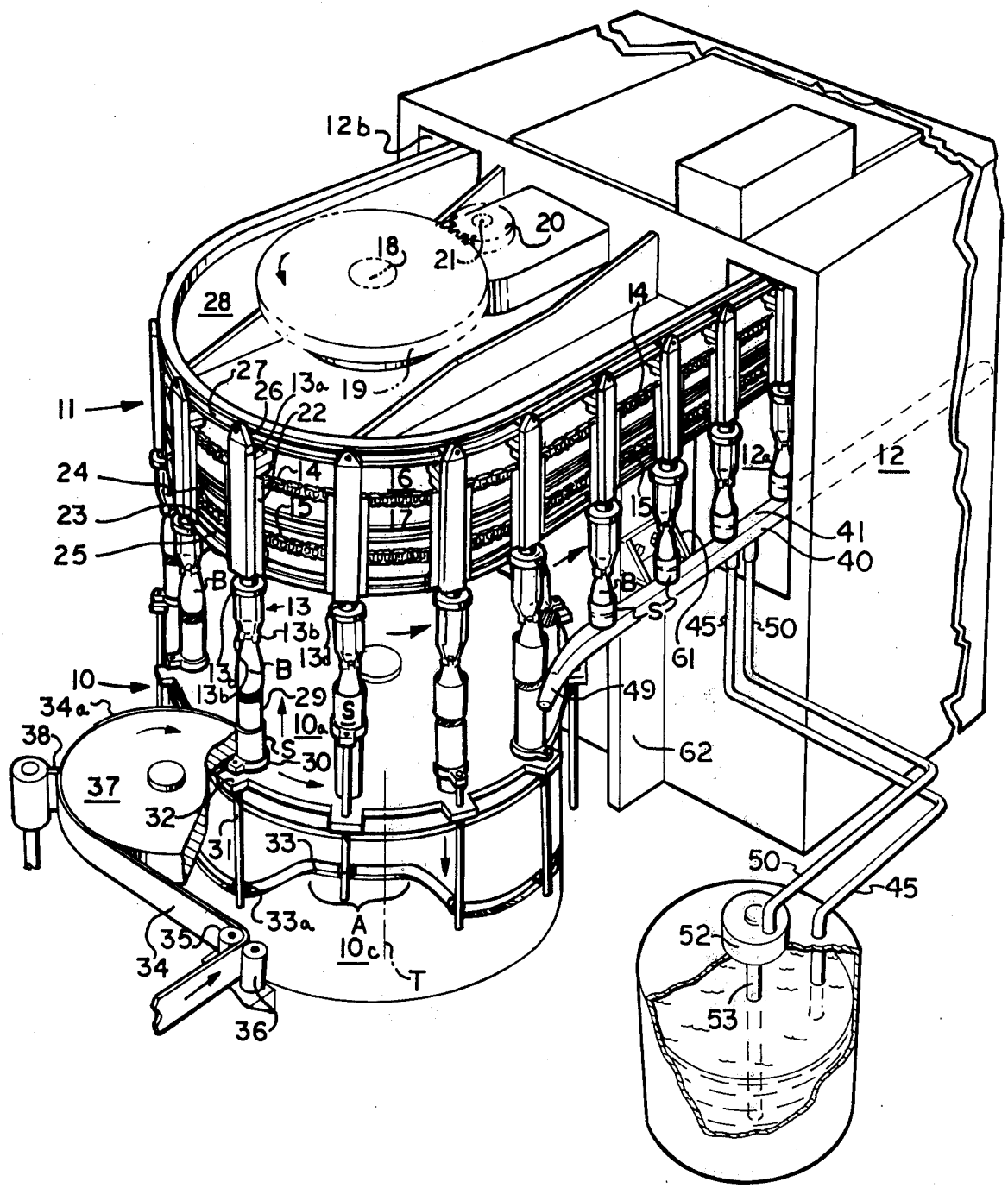
FIG. 1 is a three-quarter front perspective view of a machine for applying plastic sleeves onto glass containers, and incorporates the apparatus of the invention.

Shown on FIG. 1 is a machine for producing plastic sleeves on a turret machine 10, assembling them telescopically over rigid base articles carried by the conveyor 11 and shrinking them thereon in a heating apparatus 12. The rigid base articles in the examples of the present disclosure are the glass bottles B, and, after having a shrunken plastic covering thereon, form a composite package of a type described and shown in U.S. Pat. No. 3,760,968.

The Machine

The bottles B are fed to and loaded on the neck gripping overhead chucks 13 connected to an endless driven carriage comprised of upper and lower chains 14 and 15, respectively, extending around end-turn gears 16 and 17 each keyed onto the vertical shaft 18. A bull gear 19 is also connected at the upper end of shaft 18 in mesh with drive gear 20 connected to the power drive means (not shown) by the drive shaft 21. Power is transmitted to gear 19 to rotate it and shaft 18 counter-clockwise on FIG. 1 and drive the chains 14, 15 in a counter-clockwise direction through the endless path of the conveyor. Chucks 13 are mounted on carriage brackets 22 connected to links of the chains 14, 15. The several carriage brackets have spaced rollers 23 on their back sides running in stationary tracks 24 and 25 around the path of the conveyor. The chucks 13 are each vertically, slidably mounted on their respective carriage brackets 22 and the vertical elevation of chucks 13 is controlled by the cam roller 26 rotatably connected on the upper element 13a of the chuck running in cam track 27 fastened rigidly on the machine. The chucks 13 have three lower jaws 13b which open and close about the top end of bottle B. The jaws 13b are attached to a circular arbor including a wheel element 13c that is rotatable about shaft 13d of the chuck so that friction engagement of the periphery of the wheel element 13c of the arbor with a stationary element (to be described hereinafter) aynwhere along the path of the conveyor imparts rotation of the chucks and bottles thereon about the axis of the shaft 13d.

The end turn portion of the conveyor mechanism is supported by the upper frame 28 rigidly supported on the front wall of the oven 12.

Beneath the conveyor end-turn portion, just described, is the rotary sleeve turret 10 which is coaxial with the vertical shaft 18. Turret machine 10 is comprised of an upper annular turret 10a rotated counter-clockwise about shaft 10b over the lower stationary frame 10c.

The turret machine 10 includes a plurality of spaced mandrels 29 mounted on turret 10a whose peripheral spacing on turret 10a coincides radially and with the peripheral spacing of chucks 13 in the end-turn portion of the conveyor path. The chucks 13 have their centers in registry with the vertical central axes of underlying mandrels 29. At the base of each mandrel in an inactive position there is an annular, encircling push-up bar or stripper element 30 connected onto a vertical operating rod 31 by an arm. Rods 31 are each vertically slidable on the guides 32 connected with turret 10a and under control of the circular cam 33 extending around frame 10c in which a cam roller 33a connected to rod 31 is in running engagement. The cam 33 is a stationary element of turret frame 10c. The pattern of the rise and fall of cam 33 provides the proper vertical reciprocating motion to rod 31 and push-up bar 30 responsive to rotary movement of turret 10a.

Connected for operation with turret machine 10 is mechanism for feeding a supply of plastic strip stock and forming it to sleeve lengths. The strip stock is shown as a running web 34 guided through opposed feed rollers 35, 36 and onto the sleeve drum 37. The web 34 on drum 37 has forward lengths cut therefrom by rotary knife 38, and the cut lengths 34a are held onto drum 37 by vacuum until the leading edge thereof engages a mandrel 29 of turret 20a. The mandrel at this point is engaged by its drive means of the turret machine to rotate it more than 360° winding the strip 34a about a mandrel 29 in an end-to-end overlap of the strip to form a cylindrical shape. Thereafter, means on the turret machine connect the overlapped ends at a vertical seam to complete formation of a cylindrical, hollow sleeve S of the plastic material.

The plastic material is a polyolefin or copolymers of olefins, for example polyethylene or laminates of polyolefins, e.g. polyethylene foam layer and polyethylene film or polystyrene foam layer and ethylene ethyl acrylate film. The plastic material in sheet form is highly oriented in the longitudinal dimension of the web (circumference of sleeve S) in relation to any orientation of the plastic sheet in its transverse dimension (height of sleeve S). Examples of plastic sheet material that may be run in form of web 34 are foamed polyethylene on the order of 0.008–0.02 inch thickness highly oriented in the running direction of web 34.

In a more general way, the plastic sheet material may be a form of a contractible polyolefin or copolymer of olefins with vinyl esters, for example, vinyl acetate, or with alpha, beta, monoethylenically unsaturated acids, such as ethyl acrylate or ethylene ethyl acrylate. The plastic is preferably in form of a foam sheet or a foam/film laminate sheet. The general property of such materials in contraction (shrinking) is a first pliable, plastic state (very limp condition) at which time the sheet material tends to sag or slump, followed by an almost instantaneous shrinkage reaction. This invention deals with the propensity in the material to slump and grow during the initial stage of heating in the application of the sleeves of the material onto a rigid base article in the production herein described.

The inner circumference of sleeve S is slightly more than the exterior circumference of the article B so that the sleeve S may be telescopically applied over article B to a desired elevation on the latter. The preferred thermoplastic may be of foamed structure and such a material on the order of 10 thousandths of an inch or greater in thickness provides a suitable sleeve S for handling on the machine.

After the plastic strip 34a is wound on mandrel 29 and seamed to form sleeve S, the mandrel 29 and chuck 13 travel together through an assembly station during which the two are at zero angular velocity and displacement with respect to each other. In this span of travel, roller 33a begins its rise on cam 33, and push-up bar 30 rises on mandrel 29, which elevates sleeve S into the telescopic assembly on bottle B. Sleeve S is supported thusly by push-up bar 30 during the flat span A of cam 33.

At the point where the cam 33 falls away and push-up bar 30 is retracted, the bottle carriage path diverges tangentially away from the arc path of turret 10a.

Liquid-Cooled Sleeve Support Bar

Within a short span of travel of the conveyor 11 for bottles beyond the sleeve assembly point, the lower edge S' of the sleeves passes directly over a sleeve support bar 40 which extends in an underlying relationship to bottles B along the path into and through some of the length of the oven. Support bar 40 is supported by its connection on a cantilevered bracket 61 fastened to a vertical structural beam 62 at the front end of the oven 12 and may be adjusted for height on the vertical beam support. The top surface of support bar 40 should be positioned approximately one-half inch below the bottom of the bottles B, which is approximately equal to the amount sleeves S overhang the bottom end of the bottles in the assembly position. This overhang dimension assures the sleeve will shrink around the lower corner radius of the bottle and onto the bottom end of the bottle.

Referring to FIGS. 2 and 3, support bar 40 is shown in its relationship schematically with cure oven 12. Bottle conveyor 11 represented by dashed line, extends in a straight line through the length of oven 12. As bottles B enter the oven at its front entrance 12a, the lower edges S' of the plastic sleeves are supported in position by the fit on the bottles and assured this position by riding on the top of support bar 40. The cure oven 12 is heated by linearly spaced infra-red burners or hot air to a temperature in the range of 400°–1000° F. The support bar 40 is liquid cooled, as will be presently described, to a temperature below 200° F so as to avoid sticking of the plastic sleeves on the bar surface. The top bearing surface of bar 40 is coated with a lubricious surface layer, an example of which is "Teflon" in the form of a Teflon tape 41 or a thin Teflon surface coating.

The support bar 40 consists of one metal pipe 42 inside another pipe 43. Pipe 42 is closed at its one end 44 and a water outlet pipe 45 is connected thereat. The opposite end 46 of pipe 42 is open and is spaced from the closed end 47 of outer pipe 43. The aft end of pipe 43 may be slightly sloped downwardly at 48. The forward end 49 of pipe 43 is curved downwardly from the horizontal sleeve support plane (shown in dotted line extension) for providing a gentle camming action in the engagement of the support bar with the sleeves S. The outer pipe 43 is curved at forward end 49 in the horizontal plane to fit into position at turret 10a and avoid interference with mandrels 29 thereon (FIG. 1). Adjacent the curved forward end portion 49 of pipe 43 is a water inlet pipe 50 connected thereto. The preferred liquid coolant is water, although other liquid coolants may be substituted in the system. Liquid coolant is supplied from tank 51 into pipe 50 by pump 52 having a snorkel feed pipe 53 in the liquid. The pump may be an electric motor driven pump assembly of conventional type. The outlet of pump 52 is connected to the inlet pipe 50 for the outside pipe 43 of the apparatus. Liquid is pumped into pipe 43, along the length thereof, cooling the outside pipe and coating to an operating temperature. Spent coolant enters the far open end 46 of inner pipe 42 for returning used coolant to the tank. Circulated coolant is drained through outlet pipe 45 and back to the tank 51 for recirculation by pump 52.

The length of the support bar 40 should be long enough to extend from its outer sloped end 49 near the turret machine 10 to and into oven 12 a sufficient extent to allow for oven heat to shrink the sleeve S substantially or enough to grip the bottle firmly. Usually, this requires the sleeve S to traverse approximately one-half the length of the oven, designated as dimension L on FIG. 2. The oven length L extends from the entrance opening 12a to the exit opening at 12e. At the time the bottle B and sleeve S thereon are conveyed away from the turret path of the turret machine 10 (FIG. 1), the bottle and sleeve assembly are conveyed directly over the top of support bar 40. In the initial stages of travel toward and into the oven 12, (before shrinking of the plastic sleeve takes place) the bottom edge S' of the sleeve S rides over the reduced friction top surface 41 of the support bar. At a later stage of travel inside oven 12, the plastic will shrink; whereupon, the edge S' of the sleeve will raise onto the bottle bottom such as is shown by the bottle at the right hand side of FIG. 2.

In the present invention, the sleeve support bar apparatus remains cool so that the thermoplastic sleeves do not stick on the bar as they move thereover, plus the support bar is designed with the coolant inlet pipe encircling the coolant outlet pipe, so as to be very compact and versatile in operation. The preferred circulation is that shown; however, the inlet and outlet pipes may be switched at the pump and tank reversing the circulation. This cooling arrangement will operate best, however, by having the fresh cooling liquid supplied to the outside pipe (as shown) which provides faster cooling of the surface 41.

The support bar extends into the middle of the oven and therefore would become extremely hot if not cooled. Because some species of polyolefin materials shrink more slowly in relation to production speeds of the assembly machinery, it is necessary to support the sleeves into the oven at least until substantial shrinkage of the material takes place so as to hold the sleeves firmly in place on the container. To facilitate service and operation of the support bar, the disclosed cantilevered support thereof from the single bracket located outside the oven chamber is important.

Further modifications may be resorted to without departing from the spirit and scope of the appended claims.

What is claimed is:

1. Apparatus for assembly and shrinking tubular sleeves of heat contractible thermoplastic onto base articles including a turret and plural spaced mandrels thereon, a base article conveyor with plural spaced articles held by chucks thereon and carrying said articles in a path past the mandrels to receive a sleeve on each article and thereafter into an elongated heating device for contracting the sleeves onto the articles by heat, the improvement therein comprising an elongated support bar and means supporting the elongated support bar underlying the path of the conveyor to extend from adjacent the mandrels of said turret to said heating device and within said heating device, said support bar having a first external segment outside of said heating device and a second segment extending longitudinally within said heating device, the upper surface of said elongated support bar engaging the lower edge of the sleeves in their assembled position on the base articles and supporting them during travel to and within the heating device.

2. The apparatus of claim 1, in which the elongated support bar includes cooling means connected thereto for maintaining the upper surface of said support bar below 200° F so as to avoid sticking of the plastic material on said surface during movement along said surface.

3. The apparatus of claim 1, wherein the elongated support bar comprises an outer pipe member closed at its opposite ends defining a coolant chamber, a source of coolant, an inlet pipe connected to said support bar chamber at its external segment, an outlet pipe connected to the support bar chamber, and means for circulating a coolant liquid through said support bar chamber to maintain it at reduced temperature, said means including a source of coolant and pump means interposed between said source and said inlet pipe.

4. The apparatus of claim 3, wherein the upper surface of the support bar includes a coating of friction reducing material thereon along a substantial portion of the length thereof.

5. The apparatus of claim 4, wherein the friction reducing material comprises Teflon.

6. The apparatus of claim 5, wherein said Teflon coating comprises a layer of Teflon tape affixed to the top surface of the elongated support bar.

7. The apparatus of claim 1, wherein the elongated support bar comprises an outer pipe closed at its opposite ends, an inner pipe of lesser O.D. than the I.D. of said outer pipe that is closed at one end and open at its opposite end and supported within the outer pipe to provide a space therebetween for circulation of coolant, the inner pipe being connected to the outer pipe through the open end of said inner pipe, a source of coolant, conduit means connecting said source to each of said pipes, and pump means connected to said conduit means for circulating coolant to one of said pipes, the spent coolant being returned to said source from the other of said pipes by said conduit means for recirculation 8. The apparatus of claim 7, wherein the conduit means comprises a first fluid conduit connected to said source and to the outer pipe near its external end, a pump interposed in operating relationship with said first fluid conduit for pumping coolant from the source to said outer pipe, and a second fluid conduit connected to said inner pipe near its closed end and to said source.

9. The apparatus of claim 4, wherein the elongated support bar has its upper surface sloped downwardly at its end extremities.

10. The apparatus of claim 4, wherein the elongated heating device comprises an elongated oven enclosure open at its opposite ends, said conveyor extending through said enclosure, and said second support bar segment extends within said oven enclosure approximately one-half its length.

11. The apparatus of claim 1, wherein the means supporting the elongated support bar comprises a cantilevered support bracket connected to said support bar at its first external segment and disposed outside the heating device for single point horizontal support thereof in an operating position, the second segment of said support bar depending therefrom into said heating device.

12. In an apparatus for shrinking tubular sleeves of heat shrinkable thermoplastic onto glass containers, the combination comprising an elongated oven enclosure open at its opposite ends to define the entrance and exit thereto and operable for heat shrinking said thermoplastic sleeves in snug fitting surface relationship on said glass containers during movement through the oven, a conveyor having spaced apart chucks thereon supporting glass containers in an upright position, the containers having loose fitting tubular sleeves of said thermoplastic positioned thereon to depend a predetermined amount below the bottom of the containers, said conveyor travelling in a path extending longitudinally through said oven enclosure.

- a horizontally extending elongated support bar mounted below the path of said conveyor, a portion thereof extending outwardly from said oven entrance and the remaining portion extending into the oven, the uppermost surface of said support bar adapted to engage the bottom edge of the sleeves positioned on the containers and maintain that position until shrunken onto the containers.
- a cooling means connected to said support bar to maintain the uppermost surface thereof at a temperature to avoid sticking of the plastic sleeves engaged thereon, and
- a friction reducing coating on said uppermost surface extending substantially the length of said support bar, whereby said plastic sleeves are guided thereby.

13. The combination of claim 12, wherein said friction reducing coating comprises a layer of Teflon tape adhered to the uppermost surface of said support bar.

14. The combination of claim 13, wherein said elongated support bar comprises an outer pipe closed at its opposite ends to define an internal cooling chamber and an inner pipe of lesser O.D. than the I.D. of said outer pipe disposed in said chamber, the inner pipe being closed at one end and open at its opposite end, a tank containing a supply of coolant, an inlet conduit connected to said outer pipe and to said tank, a pump interposed in said inlet conduit operable for pumping coolant into said cooling chamber, and an outlet conduit connected to said inner pipe near its closed end and to said tank for returning coolant to said tank that is flowing in said inner pipe from the coolant received at the open end of the latter from the coolant chamber.

* * * * *